(12) United States Patent
Ko et al.

(10) Patent No.: US 11,435,557 B2
(45) Date of Patent: Sep. 6, 2022

(54) OPTICAL IMAGING SYSTEM INCLUDING EIGHT LENSES OF ++-+-+-- OR ++-+-++- REFRACTIVE POWERS

(71) Applicant: Samsung Electro-Mechanics Co., Ltd., Suwon-si (KR)

(72) Inventors: Jung Hui Ko, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 65 days.

(21) Appl. No.: 16/658,244

(22) Filed: Oct. 21, 2019

(65) Prior Publication Data

US 2020/0363610 A1 Nov. 19, 2020

(30) Foreign Application Priority Data

May 13, 2019 (KR) ........................ 10-2019-0055680

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
CPC .............................. G02B 9/64; G02B 13/0045
See application file for complete search history.

(56) References Cited

U.S. PATENT DOCUMENTS

| | | | | |
|---|---|---|---|---|
| 4,717,245 A | * | 1/1988 | Takahashi | G02B 13/18 359/754 |
| 9,477,064 B1 | | 10/2016 | Chen et al. | |
| 9,523,841 B1 | | 12/2016 | Chen | |
| 11,262,540 B2 | | 3/2022 | Huang | |
| 2015/0103413 A1 | | 4/2015 | Uchida et al. | |
| 2017/0329108 A1 | | 11/2017 | Hashimoto | |
| 2020/0064593 A1 | * | 2/2020 | Tseng | G02B 9/64 |
| 2020/0132969 A1 | * | 4/2020 | Huang | G02B 9/64 |
| 2021/0018728 A1 | * | 1/2021 | Li | G02B 27/0025 |

FOREIGN PATENT DOCUMENTS

| | | | |
|---|---|---|---|
| CN | 108681040 A | | 10/2018 |
| CN | 108761730 A | * | 11/2018 |
| CN | 108983399 A | * | 12/2018 |
| CN | 109581631 A | | 4/2019 |
| CN | 111090164 A | | 5/2020 |
| DE | 103 53 563 A1 | | 6/2005 |
| JP | 5716137 B2 | | 5/2015 |
| JP | 2017-116594 A | | 6/2017 |
| KR | 20160075235 A | * | 6/2016 |

OTHER PUBLICATIONS

Chinese Office Action dated May 30, 2022, in counterpart Chinese Patent Application No. 202010061551.4 (11 pages in English and 11 pages in Chinese).

* cited by examiner

*Primary Examiner* — Wen Huang

(74) *Attorney, Agent, or Firm* — NSIP Law

(57) ABSTRACT

An optical imaging system includes a first lens, a second lens, a third lens, a fourth lens, a fifth lens, a sixth lens, a seventh lens, and an eighth lens, which are sequentially arranged from an object side optical imaging system. The first lens has positive refractive power and the second lens has positive refractive power. At least one of the lenses has negative refractive power with a refractive index greater than 1.68.

17 Claims, 8 Drawing Sheets

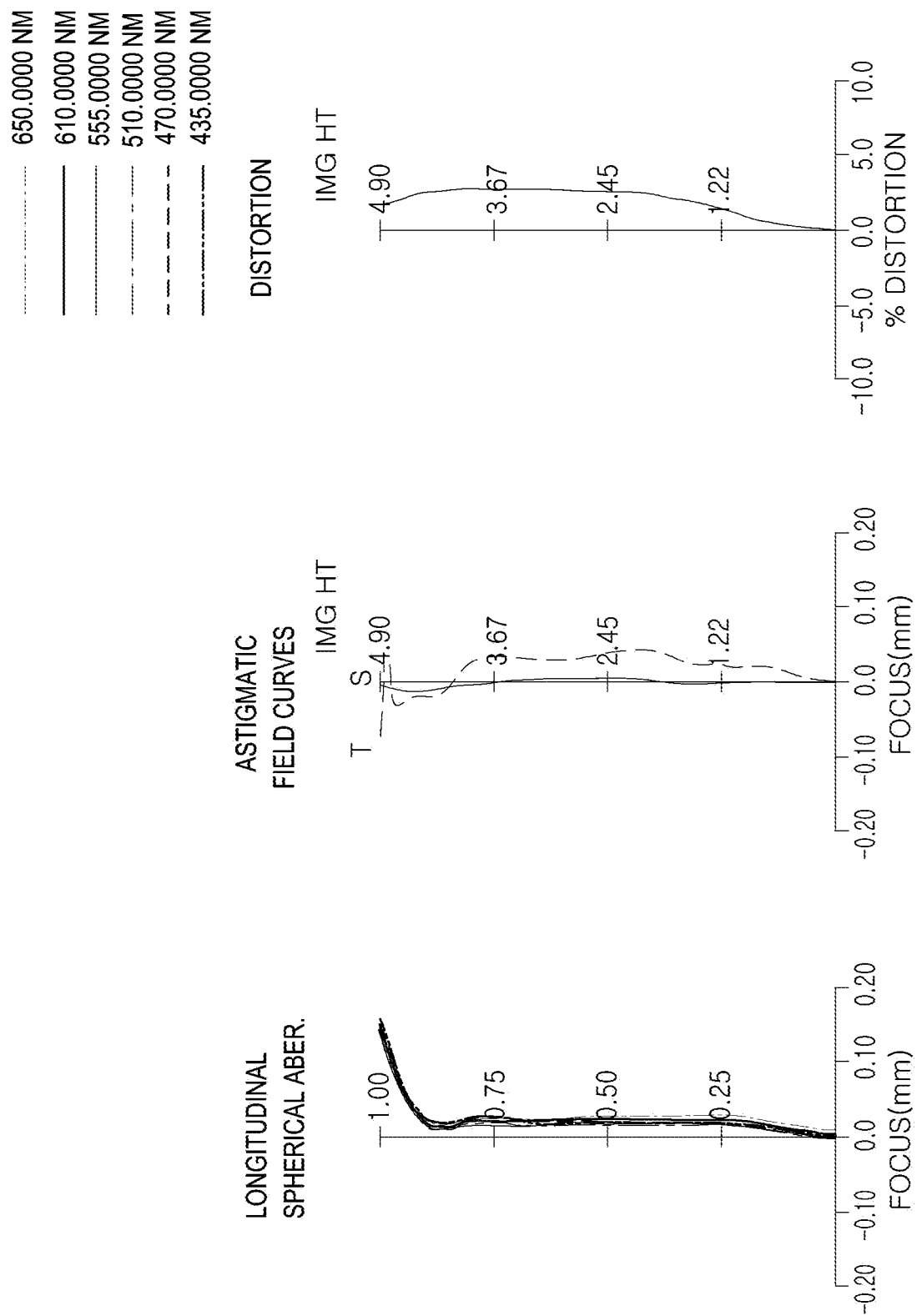

OPTICAL IMAGING SYSTEM INCLUDING EIGHT LENSES OF ++−+−+−− OR ++−+−++− REFRACTIVE POWERS

CROSS-REFERENCE TO RELATED APPLICATION(S)

This application claims the benefit under 35 USC 119(a) of Korean Patent Application No. 10-2019-0055680 filed on May 13, 2019 in the Korean Intellectual Property Office, the entire disclosure of which is incorporated herein by reference for all purposes.

BACKGROUND

1. Field

The following description relates to an optical imaging system.

2. Description of Background

Mobile communications terminals have been provided with camera modules, enabling video calling and image capturing. In addition, as levels of functionality of cameras in such mobile communications terminals have gradually increased, cameras for use in mobile communications terminals have gradually been required to have higher levels of resolution and performance.

However, since there is a trend for mobile communications terminals to be gradually miniaturized and lightened, there are limitations in realizing camera modules having high resolution and performance.

In order to solve such problems, recent camera lenses have been formed of plastic, a material lighter than glass, and optical imaging systems have been configured of five or six lenses to implement a high level of resolution.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An optical imaging system capable of improving an aberration improvement effect and implementing high resolution.

In one general aspect, an optical imaging system includes: a first lens, a second lens, a third lens, a fourth lens, a fifth lens, a sixth lens, a seventh lens, and an eighth lens, which are sequentially arranged from an object side of the optical imaging system, the first lens has positive refractive power, the second lens has positive refractive power, and at least one of the lenses has negative refractive power with a refractive index greater than 1.68.

At least three of the lenses may have negative refractive power with a refractive index greater than 1.66.

A refractive index of lenses having negative refractive power, among the first lens to the seventh lens, may be greater than a refractive index of lenses having positive refractive power.

The third lens may have negative refractive power with a refractive index greater than 1.68, and among the lenses, the refractive index of the third lens may be the greatest.

The optical imaging system may satisfy FOV>70°, where FOV is a field of view of an imaging system including the lenses.

The optical imaging system may satisfy f/EPD<1.5, where f is an overall focal length of an imaging system including the lenses and EPD is a diameter of an entrance pupil.

The optical imaging system may include a stop disposed between the first lens and the second lens.

The optical imaging system may satisfy SD/TD>0.8, where SD is an optical axis distance from the stop to an image-side surface of the eighth lens, and TD is an optical axis distance from an object-side surface of the first lens to the image-side surface of the eighth lens.

The optical imaging system may satisfy TTL/(2*IMG HT)<0.9, where TTL is an optical axis distance from an object-side surface of the first lens to an image capturing surface of an image sensor, and IMG HT is half of a diagonal length of the image capturing surface of the image sensor.

The third lens may have negative refractive power.
The fourth lens may have positive refractive power.
The fifth lens may have negative refractive power.
The sixth lens may have positive refractive power.
The seventh lens may have positive or negative refractive power, and the eighth lens may have negative refractive power.

In another general aspect, an optical imaging system includes: a first lens, a second lens, a third lens, a fourth lens, a fifth lens, a sixth lens, a seventh lens, and an eighth lens, which are sequentially arranged from an object side of the optical imaging system, the first lens has positive refractive power, the second lens has positive refractive power, at least four lenses among the third lens to the eighth lens have negative refractive power, and a refractive index of at least one of the lenses having negative refractive power is greater than 1.68.

The optical imaging system may satisfy Fno<1.5, where Fno is an F-number of an imaging system including the lenses.

An absolute value of a focal length of the seventh lens may be the greatest among the lenses.

An absolute value of a focal length of the eighth lens may be the least among the lenses.

In another general aspect, an optical imaging system includes: a first lens, a second lens, a third lens, a fourth lens, a fifth lens, a sixth lens, a seventh lens, and an eighth lens sequentially arranged from an object side of the optical imaging system. At least four of the lenses have positive refractive power and at least three of the lenses have negative refractive power, and Fno<1.5, where Fno is an F-number of an imaging system including the lenses.

Other features and aspects will be apparent from the following detailed description, the drawings, and the claims.

BRIEF DESCRIPTION OF DRAWINGS

FIG. 8 is a view illustrating aberration characteristics of the optical imaging system illustrated in FIG. 7.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
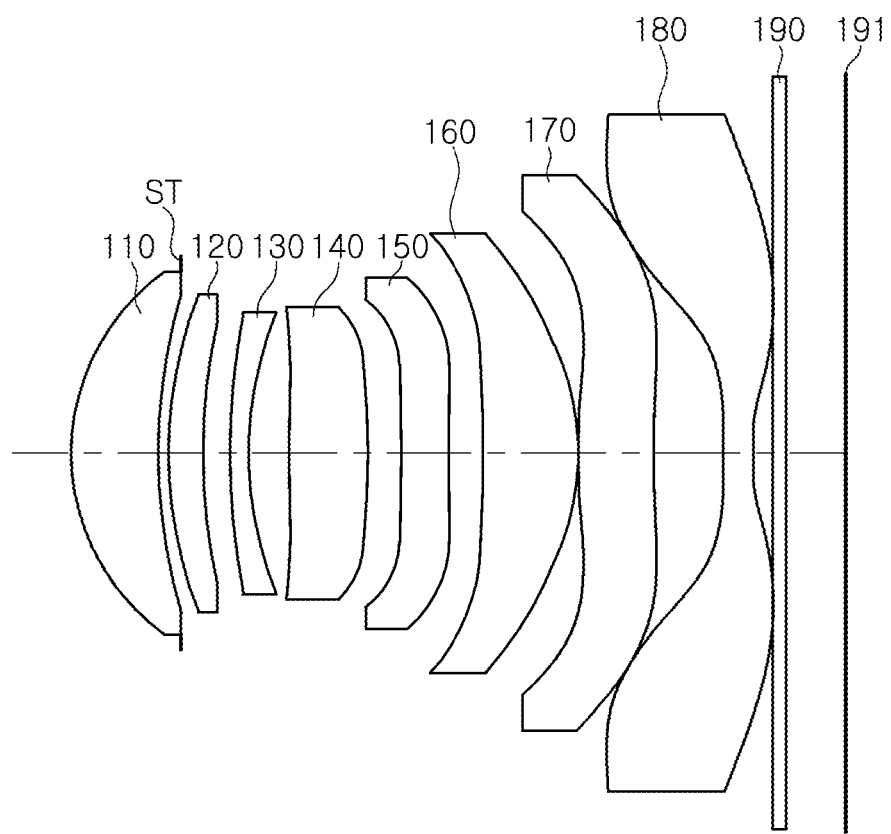
FIG. 1 is a view illustrating an optical imaging system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the drawings, the thicknesses, sizes, and shapes of lenses are somewhat exaggerated for convenience of explanation. In particular, the shapes of spherical surfaces or aspherical surfaces illustrated in the drawings are only illustrative. That is, the shapes of the spherical surfaces or the aspherical surfaces are not limited to those illustrated in the drawings.

Herein, a first lens refers to a lens closest to an object, while an eighth lens refers to a lens closest to an image sensor.

In addition, a first surface of each lens refers to a surface thereof closest to an object side (or an object-side surface) and a second surface of each lens refers to a surface thereof closest to an image side (or an image-side surface). Further, all numerical values of radii of curvature and thicknesses or distances of lenses, and the like, are indicated by millimeters (mm), and a field of view (FOV) is indicated by degrees.

Further, in a description for a shape of each of the lenses, the meaning that one surface of a lens is convex is that a paraxial region portion of a corresponding surface is convex, and the meaning that one surface of a lens is concave is that a paraxial region portion of a corresponding surface is concave. Therefore, although it is described that one surface of a lens is convex, an edge portion of the lens may be concave. Likewise, although it is described that one surface of a lens is concave, an edge portion of the lens may be convex.

A paraxial region refers to a very narrow region including an optical axis.

An optical imaging system according to various examples may include eight lenses.

For example, the optical imaging system may include a first lens, a second lens, a third lens, a fourth lens, a fifth lens, a sixth lens, a seventh lens, and an eighth lens, which are sequentially arranged from the object side. The first lens to the eighth lens are respectively spaced apart from each other by a predetermined distance along the optical axis.

However, the optical imaging system is not limited to only including eight lenses, but may further include other components, when necessary.

For example, the optical imaging system may further include an image sensor converting an image of a subject incident on the image sensor into an electrical signal.

The optical imaging system may further include an infrared filter (hereinafter, 'filter') cutting off infrared rays. The filter may be disposed between the eighth lens and the image sensor.

The optical imaging system may further include a stop controlling an amount of light.

In the optical imaging system according to various examples, the first to eighth lenses may be formed of plastic.

At least one of the first to eighth lenses may have an aspherical surface. Further, each of the first to eighth lenses may have at least one aspherical surface.

That is, at least one of first and second surfaces of all of the first to eighth lenses may be aspherical. The aspherical surfaces of the first to eighth lenses may be represented by the following Equation 1:

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + IY^{20} \ldots \quad \text{Equation 1}$$

In Equation 1, c is a curvature (an inverse of a radius of curvature) of a lens, K is a conic constant, and Y is a distance from a certain point on an aspherical surface of the lens to an optical axis. In addition, constants A to I are aspherical coefficients. In addition, Z is a distance from the certain point on the aspherical surface of the lens to a tangential plane meeting the apex of the aspherical surface of the lens.

The optical imaging system including the first to eighth lenses may have positive refractive power/positive refractive power/negative refractive power/positive refractive power/negative refractive power/positive refractive power/negative refractive power/negative refractive power sequentially from the object side. Alternatively, the first to eighth lenses may have positive refractive power/positive refractive power/negative refractive power/positive refractive power/negative refractive power/positive refractive power/positive refractive power/negative refractive power.

The optical imaging system according to various examples may satisfy the following Conditional Expressions:

f/EPD<1.5                  Conditional Expression 1:

SD/TD>0.8                Conditional Expression 2:

FOV>70°                  Conditional Expression 3:

TTL/(2*IMG HT)<0.9        Conditional Expression 4:

In the Conditional Expressions, f is an overall focal length of the optical imaging system, EPD is a diameter of entrance pupil, SD is an optical axis distance from the stop to an image-side surface of the eighth lens, TD is an optical axis distance from an object-side surface of the first lens to an image-side surface of the eighth lens, FOV is a field of view of the optical imaging system, TTL is an optical axis distance from the object-side surface of the first lens to an image capturing surface of the image sensor, and IMG HT is half of a diagonal length of the image capturing surface of the image sensor.

In the Conditional Expressions, f/EPD is an F number of the optical imaging system.

The first lens has positive refractive power. The first lens may have a meniscus shape of which an object-side surface is convex. For example, a first surface of the first lens may be convex, and a second surface thereof may be concave.

At least one of the first and second surfaces of the first lens may be aspherical. For example, both surfaces of the first lens may be aspherical.

The second lens may have positive refractive power. The second lens may have a meniscus shape of which an object-side surface is convex. For example, a first surface of the second lens may be convex, and a second surface thereof may be concave.

At least one of the first and second surfaces of the second lens may be aspherical. For example, both surfaces of the second lens may be aspherical.

The third lens may have negative refractive power. The third lens may have a meniscus shape of which an object-side surface is convex. For example, a first surface of the third lens may be convex, and a second surface thereof may be concave.

At least one of the first and second surfaces of the third lens may be aspherical. For example, both surfaces of the third lens may be aspherical.

The fourth lens may have positive refractive power. Both surfaces of the fourth lens may be convex in the paraxial region. For example, first and second surfaces of the fourth lens may be convex in the paraxial region.

At least one inflection point may be formed on at least one of the first and second surfaces of the fourth lens. For example, the first surface of the fourth lens may be convex in a paraxial region and become concave toward an edge thereof. The second surface of the fourth lens may be convex in a paraxial region and become concave toward an edge thereof.

At least one of the first and second surfaces of the fourth lens may be aspherical. For example, both surfaces of the fourth lens may be aspherical.

The fifth lens may have negative refractive power. The fifth lens may have a meniscus shape of which an object-side surface is convex. For example, a first surface of the fifth lens may be convex, and a second surface thereof may be concave.

At least one inflection point may be formed on at least one of the first and second surfaces of the fifth lens. For example, the first surface of the fifth lens may be convex in a paraxial region and become concave toward an edge thereof. The second surface of the fifth lens may be concave in a paraxial region and become convex toward an edge thereof.

At least one of the first and second surfaces of the fifth lens may be aspherical. For example, both surfaces of the fifth lens may be aspherical.

The sixth lens may have positive refractive power. Both surfaces of the sixth lens may be convex. For example, first and second surfaces of the sixth lens may be convex.

At least one inflection point may be formed on at least one of the first and second surfaces of the sixth lens. For example, the first surface of the sixth lens may be convex in a paraxial region and become concave toward an edge thereof.

At least one of the first and second surfaces of the sixth lens may be aspherical. For example, both surfaces of the sixth lens may be aspherical.

The seventh lens may have positive or negative refractive power. The seventh lens may have a meniscus shape of which an image-side surface is convex. For example, a first surface of the seventh lens may be concave in a paraxial region, and a second surface thereof may be convex in the paraxial region.

Alternatively, both surfaces of the seventh lens may be concave. For example, first and second surfaces of the seventh lens may be concave in the paraxial region.

Alternatively, the seventh lens may have a meniscus shape of which an object-side surface is convex. For example, a first surface of the seventh lens may be convex in a paraxial region, and a second surface thereof may be concave in the paraxial region.

At least one inflection point may be formed on at least one of the first and second surfaces of the seventh lens. For example, the first surface of the seventh lens may be concave in a paraxial region and become convex toward an edge thereof. The second surface of the seventh lens may be convex in a paraxial region and become concave toward an edge thereof.

At least one of the first and second surfaces of the seventh lens may be aspherical. For example, both surfaces of the seventh lens may be aspherical.

The eighth lens may have negative refractive power. Both surfaces of the eighth lens may be concave. For example, first and second surfaces of the eighth lens may be concave in a paraxial region.

At least one inflection point may be formed on at least one of the first and second surfaces of the eighth lens. For example, the first surface of the eighth lens may be concave in a paraxial region and become convex toward an edge thereof. The second surface of the eighth lens may be concave in the paraxial region and become convex toward an edge thereof.

At least one of the first and second surfaces of the eighth lens may be aspherical. For example, both surfaces of the eighth lens may be aspherical.

Among the lenses having negative refractive power, at least three lenses have a refractive index greater than 1.66.

Among the lenses having negative refractive power, at least one lens has a refractive index greater than 1.68. For example, the third lens has negative refractive power, and a refractive index thereof is greater than 1.68. The refractive index of the third lens is greater than refractive indices of other lenses.

Among the first lens to the seventh lens, the lenses having negative refractive power may be formed to have a refractive index greater than that of the lenses having the positive refractive power.

That is, in the remaining lenses except for the eighth lens disposed closest to the image sensor, a refractive index of the lenses having negative refractive power may be greater than a refractive index of the lenses having the positive refractive power.

Among the first lens to the eighth lens, the absolute value of the focal length of the seventh lens is the largest, and the absolute value of the focal length of the eighth lens is the smallest.

In the optical imaging system configured as described above, a plurality of lenses may perform an aberration correction function to increase aberration improvement performance.

An optical imaging system according to a first example is hereinafter described with reference to FIGS. 1 and 2.

The optical imaging system according to the first example may include a first lens 110, a second lens 120, a third lens 130, a fourth lens 140, a fifth lens 150, a sixth lens 160, a seventh lens 170, and an eighth lens 180, and may further include a stop ST, a filter 190 and an image sensor 191.

Lens characteristics (radii of curvature, thicknesses of lenses or distances between the lenses, refractive indices, and Abbe numbers) of each lens are shown in Table 1.

TABLE 1

| Surface No. | Ref. | Radius of Curvature | Thickness/ Distance | Refractive Index | Abbe Number |
|---|---|---|---|---|---|
| 1 | First Lens | 3.00654 | 0.9409 | 1.5441 | 56.1 |
| 2 | Stop | 9.05124 | 0.1 | | |
| 3 | Second Lens | 6.62019 | 0.35364 | 1.5441 | 56.1 |
| 4 | | 11.71969 | 0.28385 | | |
| 5 | Third Lens | 8.75989 | 0.20128 | 1.6869 | 18.4 |
| 6 | | 4.40955 | 0.43089 | | |
| 7 | Fourth Lens | 15.62133 | 0.79999 | 1.5441 | 56.1 |
| 8 | | −68.09635 | 0.4048 | | |
| 9 | Fifth Lens | 28.43478 | 0.48388 | 1.6776 | 19.2 |
| 10 | | 12.04177 | 0.37924 | | |
| 11 | Sixth Lens | 106.25799 | 0.99253 | 1.5441 | 56.1 |
| 12 | | −2.85338 | 0.02 | | |
| 13 | Seventh Lens | −35.38797 | 0.78031 | 1.6669 | 20.4 |
| 14 | | −69.10479 | 0.75329 | | |
| 15 | Eighth Lens | −12.36402 | 0.3 | 1.5441 | 56.1 |
| 16 | | 2.77022 | 0.20034 | | |
| 17 | Filter | Infinity | 0.11 | | |
| 18 | | Infinity | 0.64 | | |
| 19 | Image Capturing Surface | Infinity | | | |

According to the first example, an overall focal length of the optical imaging system f is 6.21 mm, Fno is 1.47, BFL is 0.95 mm, FOV is 74.8°, and IMG HT is 4.7 mm.

Fno is an F number of the optical imaging system, BFL is an optical axis distance from an image-side surface of the eighth lens to the image capturing surface of the image sensor, FOV is a field of view of the optical imaging system, and IMG HT is half of a diagonal length of the image capturing surface of the image sensor.

In the first example, the first lens 110 may have positive refractive power, and a first surface of the first lens 110 may be convex and a second surface of the first lens 110 may be concave.

The second lens 120 may have positive refractive power, and a first surface of the second lens 120 may be convex and a second surface of the second lens 120 may be concave.

The third lens 130 may have negative refractive power, and a first surface of the third lens 130 may be convex and a second surface of the third lens may be concave.

The fourth lens 140 may have positive refractive power, and the first and second surfaces of the fourth lens 140 are convex in a paraxial area.

At least one inflection point may be formed on at least one of the first and second surfaces of the fourth lens 140. For example, the first surface of the fourth lens 140 may be convex in a paraxial region and become concave toward an edge thereof. The second surface of the fourth lens 140 may be convex in a paraxial region and become concave toward an edge thereof.

The fifth lens 150 may have negative refractive power, and a first surface of the fifth lens 150 may be convex in a paraxial area and a second surface of the fifth lens 150 may be concave in the paraxial area.

At least one inflection point may be formed on at least one of the first and second surfaces of the fifth lens 150. For example, the first surface of the fifth lens 150 may be convex in a paraxial region and become concave toward an edge thereof. The second surface of the fifth lens 150 may be concave in a paraxial region and become convex toward an edge thereof.

The sixth lens 160 may have positive refractive power, and the first and second surfaces of the sixth lens 160 are convex in a paraxial area.

At least one inflection point may be formed on at least one of the first and second surfaces of the sixth lens 160. For example, the first surface of the sixth lens 160 may be convex in a paraxial region and become concave toward an edge thereof.

The seventh lens 170 may have negative refractive power, and a first surface of the seventh lens 170 may be concave in a paraxial area and a second surface of the seventh lens 170 may be convex in the paraxial area.

At least one inflection point may be formed on at least one of the first and second surfaces of the seventh lens 170. For example, the first surface of the seventh lens 170 may be concave in a paraxial region and become convex toward an edge thereof. The second surface of the seventh lens 170 may be convex in a paraxial region and become concave toward an edge thereof.

The eighth lens 180 may have negative refractive power, and the first and second surfaces of the eighth lens 180 are concave in a paraxial area.

At least one inflection point may be formed on at least one of the first and second surfaces of the eighth lens 180. For example, the first surface of the eighth lens 180 may be concave in a paraxial region and become convex toward an edge thereof. The second surface of the eighth lens 180 may be concave in a paraxial region and become convex toward an edge thereof.

Respective surfaces of the first to eighth lenses 110 to 180 may have aspherical coefficients as illustrated in Table 2. For example, all of object-side surfaces and image-side surfaces of the first to eighth lenses 110 to 180 may be aspherical.

The stop ST may be disposed between the first lens 110 and the second lens 120.

Figure 2:
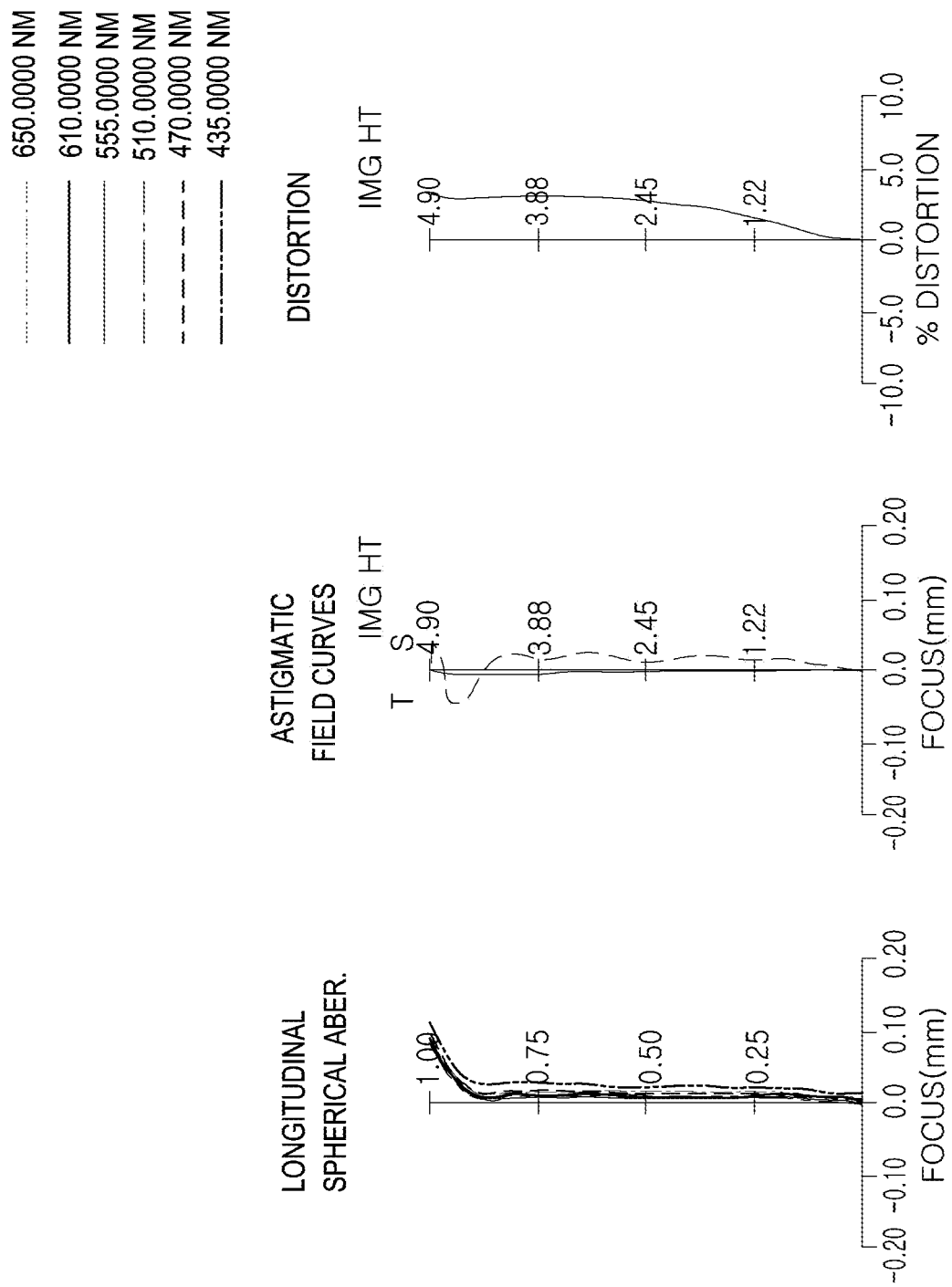
FIG. 2 is a view illustrating aberration characteristics of the optical imaging system illustrated in FIG. 1.

The imaging optical system of FIG. 1 may have the aberration characteristics illustrated in FIG. 2.

An optical imaging system according to a second example is hereinafter described with reference to FIGS. 3 and 4.

The optical imaging system according to the second example may include a first lens 210, a second lens 220, a third lens 230, a fourth lens 240, a fifth lens 250, a sixth lens 260, a seventh lens 270, and an eighth lens 280, and may further include a stop ST, a filter 290 and an image sensor 291.

Lens characteristics (radii of curvature, thicknesses of lenses or distances between the lenses, refractive indices, and Abbe numbers) of each lens are shown in Table 3.

TABLE 3

| Surface No. | Ref. | Radius of Curvature | Thickness/ Distance | Refractive Index | Abbe Number |
|---|---|---|---|---|---|
| 1 | First Lens | 2.98996 | 0.9581 | 1.5441 | 56.1 |
| 2 | Stop | 8.81529 | 0.1 | | |
| 3 | Second Lens | 6.31036 | 0.3803 | 1.5441 | 56.1 |
| 4 | | 12.5199 | 0.25307 | | |
| 5 | Third Lens | 9.22654 | 0.2 | 1.6869 | 18.4 |
| 6 | | 4.41804 | 0.48132 | | |
| 7 | Fourth Lens | 21.75041 | 0.75411 | 1.5441 | 56.1 |
| 8 | | −44.40022 | 0.39779 | | |
| 9 | Fifth Lens | 21.13638 | 0.51433 | 1.6776 | 19.2 |
| 10 | | 10.16271 | 0.4067 | | |
| 11 | Sixth Lens | 40.7199 | 0.81628 | 1.5441 | 56.1 |
| 12 | | −2.89341 | 0.02 | | |
| 13 | Seventh Lens | −106.759 | 0.67866 | 1.6669 | 20.4 |
| 14 | | 277.34083 | 0.78926 | | |
| 15 | Eighth Lens | −12.047 | 0.3 | 1.5441 | 56.1 |
| 16 | | 2.80555 | 0.20033 | | |
| 17 | Filter | Infinity | 0.11 | | |
| 18 | | Infinity | 0.64 | | |
| 19 | Image Capturing Surface | Infinity | | | |

According to the second example, an overall focal length of the optical imaging system f is 6.12 mm, Fno is 1.37, BFL is 0.95 mm, FOV is 75.6°, and IMG HT is 4.7 mm.

Fno, BFL, FOV, and IMG HT are defined the same as in the first example

TABLE 2

| | 1 | 2 | 3 | 4 | 5 | 6 | 7 | 8 |
|---|---|---|---|---|---|---|---|---|
| K | −0.82879 | −26.3981 | −0.45843 | 1.93822 | 2.62662 | −3.21831 | 6.57E−09 | 3.89E−09 |
| A | 0.00324 | 0.00738 | 0.00866 | 0.00963 | −0.01324 | −0.01083 | −0.01019 | −0.01751 |
| B | 0.00202 | −0.00725 | −0.01046 | −0.00799 | 0.00571 | 0.00964 | −0.00154 | 0.00433 |
| C | −0.00266 | 0.00655 | 0.0111 | 0.0062 | −0.01464 | −0.02374 | −0.00021 | −0.00897 |
| D | 0.00231 | −0.00508 | −0.01159 | −0.00766 | 0.01858 | 0.03448 | −0.00327 | 0.00767 |
| E | −0.00118 | 0.00275 | 0.00795 | 0.00662 | −0.01212 | −0.02788 | 0.0043 | −0.00445 |
| F | 0.00036 | −0.00092 | −0.00323 | −0.00328 | 0.00456 | 0.01364 | −0.00261 | 0.00162 |
| G | −6.70E−05 | 0.00018 | 0.00075 | 0.00091 | −0.00099 | −0.00401 | 0.00084 | −0.00034 |
| H | 6.57E−06 | −1.91E−05 | −9.23E−05 | −0.00013 | 0.00011 | 0.00066 | −0.00013 | 3.92E−05 |
| I | −2.67E−07 | 8.26E−07 | 4.68E−06 | 7.86E−06 | −5.47E−06 | −4.62E−05 | 8.38E−06 | −1.84E−06 |

| | 9 | 10 | 11 | 12 | 13 | 14 | 15 | 16 |
|---|---|---|---|---|---|---|---|---|
| K | −7.31662 | −43.3819 | −35.9092 | −1.2804 | 7.57E+00 | 5.20573 | −3.51953 | −0.97087 |
| A | −0.04287 | −0.04579 | −0.03046 | 0.03322 | 0.04203 | 0.02793 | −0.03711 | −0.0643 |
| B | 0.0121 | 0.02488 | 0.02766 | −0.01502 | −0.02284 | −0.0144 | −0.0027 | 0.01305 |
| C | −0.00678 | −0.01846 | −0.01656 | 0.00422 | 0.00513 | 0.00266 | 0.00278 | −0.00211 |
| D | 0.00014 | 0.00905 | 0.00595 | −0.00103 | −0.00067 | −0.00024 | −0.00051 | 0.00028 |
| E | 0.00187 | −0.00307 | −0.0015 | 0.00019 | 4.94E−05 | 8.33E−06 | 4.94E−05 | −3.04E−05 |
| F | −0.00116 | 0.00072 | 0.00027 | −2.34E−05 | −1.42E−06 | 4.64E−07 | −2.81E−06 | 2.22E−06 |
| G | 0.00034 | −0.00011 | −3.65E−05 | 1.56E−06 | −3.77E−08 | −5.70E−08 | 9.44E−08 | −1.02E−07 |
| H | −5.01E−05 | 9.87E−06 | 2.87E−06 | −5.25E−08 | 3.45E−09 | 2.19E−09 | −1.74E−09 | 2.64E−09 |
| I | 2.89E−06 | −3.80E−07 | −9.89E−08 | 6.84E−10 | −6.23E−11 | −3.12E−11 | 1.36E−11 | −2.91E−11 |

In the second example, the first lens 210 may have positive refractive power, and a first surface of the first lens 210 may be convex and a second surface of the first lens 210 may be concave.

The second lens 220 may have positive refractive power, and a first surface of the second lens 220 may be convex and a second surface of the second lens 220 may be concave.

The third lens 230 may have negative refractive power, and a first surface of the third lens 230 may be convex and a second surface of the third lens 230 may be concave.

The fourth lens 240 may have positive refractive power, and the first and second surfaces of the fourth lens 240 are convex in a paraxial area.

At least one inflection point may be formed on at least one of the first and second surfaces of the fourth lens 240. For example, the first surface of the fourth lens 240 may be convex in a paraxial region and become concave toward an edge thereof. The second surface of the fourth lens 240 may be convex in a paraxial region and become concave toward an edge thereof.

The fifth lens 250 may have negative refractive power, and a first surface of the fifth lens 250 may be convex in a paraxial area and a second surface of the fifth lens 250 may be concave in the paraxial area.

At least one inflection point may be formed on at least one of the first and second surfaces of the fifth lens 250. For example, the first surface of the fifth lens 250 may be convex in a paraxial region and become concave toward an edge thereof. The second surface of the fifth lens 250 may be concave in a paraxial region and become convex toward an edge thereof.

The sixth lens 260 may have positive refractive power, and the first and second surfaces of the sixth lens 260 are convex in a paraxial area.

At least one inflection point may be formed on at least one of the first and second surfaces of the sixth lens 260. For example, the first surface of the sixth lens 260 may be convex in a paraxial region and become concave toward an edge thereof.

The seventh lens 270 may have negative refractive power, and the first and second surfaces of the seventh lens 270 are concave in a paraxial area.

At least one inflection point may be formed on at least one of the first and second surfaces of the seventh lens 270. For example, the first surface of the seventh lens 270 may be concave in a paraxial region and become convex toward an edge thereof. The second surface of the seventh lens 270 may be concave in a paraxial region and become convex toward an edge thereof.

The eighth lens 280 may have negative refractive power, and the first and second surfaces of the eighth lens 280 are concave in a paraxial area.

At least one inflection point may be formed on at least one of the first and second surfaces of the eighth lens 280. For example, the first surface of the eighth lens 280 may be concave in a paraxial region and become convex toward an edge thereof. The second surface of the eighth lens 280 may be concave in a paraxial region and become convex toward an edge thereof.

Respective surfaces of the first to eighth lenses 210 to 280 may have aspherical coefficients as illustrated in Table 4. For example, all of object-side surfaces and image-side surfaces of the first to eighth lenses 210 to 280 may be aspherical.

The stop ST may be disposed between the first lens 210 and the second lens 220.

TABLE 4

|   | 1 | 2 | 3 | 4 | 5 | 6 | 7 | 8 |
|---|---|---|---|---|---|---|---|---|
| K | −0.82675 | −26.3981 | −0.55179 | 1.93822 | 2.62662 | −3.1364 | 0 | 0 |
| A | 0.00344 | 0.01247 | 0.01614 | 0.01575 | −0.00812 | −0.00707 | −0.00989 | −0.01892 |
| B | 0.00149 | −0.0142 | −0.0208 | −0.01746 | −0.00696 | −0.0026 | −0.00334 | 0.00718 |
| C | −0.00181 | 0.00833 | 0.01306 | 0.01126 | 0.00039 | −0.00323 | 0.00291 | −0.01259 |
| D | 0.00147 | −0.00274 | −0.00641 | −0.00703 | 0.00741 | 0.01247 | −0.00725 | 0.01052 |
| E | −0.00071 | 0.00052 | 0.00303 | 0.00431 | −0.0067 | −0.01223 | 0.00725 | −0.00599 |
| F | 0.00021 | −5.03E−05 | −0.00117 | −0.00198 | 0.00288 | 0.0064 | −0.00392 | 0.00217 |
| G | −4.06E−05 | 5.58E−07 | 0.00029 | 0.00056 | −0.00067 | −0.00193 | 0.00118 | −0.00046 |
| H | 4.31E−06 | 3.20E−07 | −3.97E−05 | −8.56E−05 | 8.12E−05 | 3.19E−04 | −1.82E−04 | 5.31E−05 |
| I | −2.01E−07 | −2.16E−08 | 2.26E−06 | 5.41E−06 | −3.97E−06 | −2.23E−05 | 1.11E−05 | −2.53E−06 |

|   | 9 | 10 | 11 | 12 | 13 | 14 | 15 | 16 |
|---|---|---|---|---|---|---|---|---|
| K | −7.31662 | −43.3819 | −35.9092 | −1.25885 | 7.57148 | 5.20574 | −3.51953 | −0.94596 |
| A | −0.04537 | −0.0472 | −0.0344 | 0.03115 | 0.04587 | 0.03085 | −0.04502 | −0.06997 |
| B | 0.01603 | 0.02689 | 0.03214 | −0.01238 | −0.02636 | −0.01781 | 0.00058 | 0.01578 |
| C | −0.01145 | −0.02078 | −0.01895 | 0.00328 | 0.0063 | 0.00399 | 0.00202 | −0.0029 |
| D | 0.00459 | 0.01091 | 0.00691 | −0.00088 | −0.00089 | −0.00054 | −0.0004 | 0.00043 |
| E | −0.0009 | −0.00399 | −0.00181 | 0.00019 | 0.00007 | 0.00005 | 0.00004 | −0.00005 |
| F | −0.00011 | 0.00099 | 0.00035 | −0.00002 | 0 | 0 | 0 | 0 |
| G | 0.00011 | −0.00016 | −0.00005 | 0 | 0 | 0 | 0 | 0 |
| H | −2.25E−05 | 1.41E−05 | 3.51E−06 | −5.58E−08 | 3.08E−09 | −2.64E−09 | −1.18E−09 | 4.04E−09 |
| I | 1.54E−06 | −5.37E−07 | −1.16E−07 | 7.53E−10 | −6.64E−11 | 2.51E−11 | 8.85E−12 | −4.43E−11 |

Figure 3:
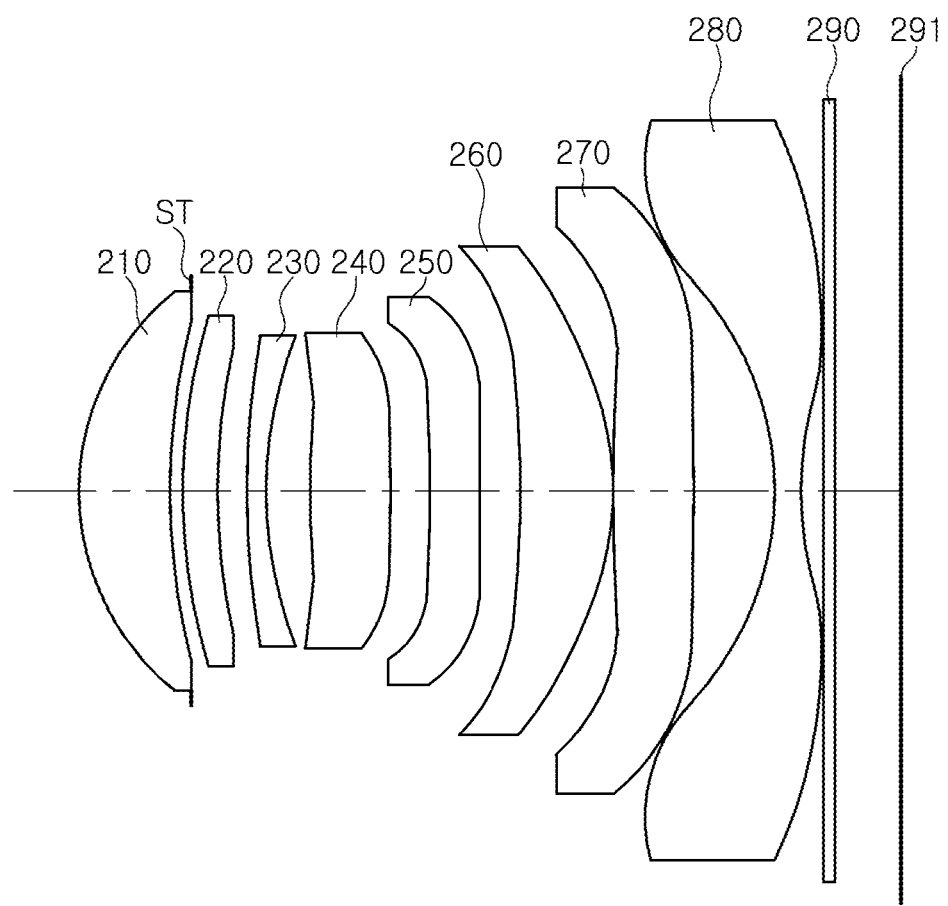
FIG. 3 is a view illustrating an optical imaging system according to a second example.
Figure 4:
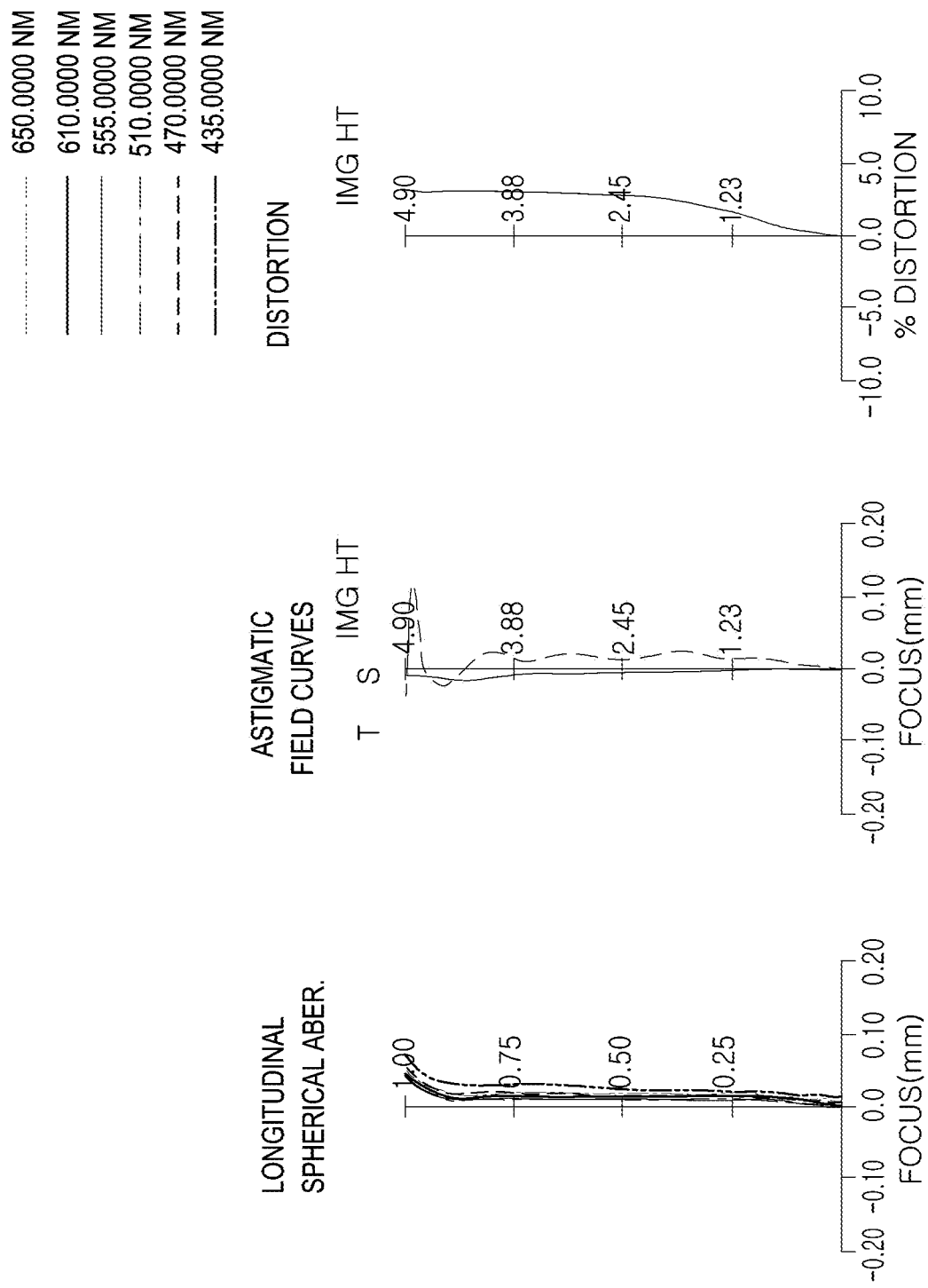
FIG. 4 is a view illustrating aberration characteristics of the optical imaging system illustrated in FIG. 3.

The imaging optical system of FIG. 3 may have the aberration characteristics illustrated in FIG. 4.

An optical imaging system according to a third example is hereinafter described with reference to FIGS. 5 and 6.

The optical imaging system according to the third example may include a first lens 310, a second lens 320, a third lens 330, a fourth lens 340, a fifth lens 350, a sixth lens 360, a seventh lens 370, and an eighth lens 380, and may further include a stop ST, a filter 390 and an image sensor 391.

Lens characteristics (radii of curvature, thicknesses of lenses or distances between the lenses, refractive indices, and Abbe numbers) of each lens are shown in Table 5.

TABLE 5

| Surface No. | Ref. | Radius of Curvature | Thickness/ Distance | Refractive Index | Abbe Number |
|---|---|---|---|---|---|
| 1 | First Lens | 2.96359 | 0.99182 | 1.5441 | 56.1 |
| 2 | Stop | 8.61137 | 0.1 | | |
| 3 | Second Lens | 6.13895 | 0.39795 | 1.5441 | 56.1 |
| 4 | | 12.54411 | 0.19752 | | |
| 5 | Third Lens | 9.06614 | 0.2 | 1.6869 | 18.4 |
| 6 | | 4.43572 | 0.528 | | |
| 7 | Fourth Lens | 29.08515 | 0.76515 | 1.5441 | 56.1 |
| 8 | | −43.56472 | 0.37591 | | |
| 9 | Fifth Lens | 21.52024 | 0.49957 | 1.6776 | 19.2 |
| 10 | | 9.9016 | 0.37036 | | |
| 11 | Sixth Lens | 28.95837 | 0.9592 | 1.5441 | 56.1 |
| 12 | | −2.93862 | 0.02 | | |
| 13 | Seventh Lens | 15659.399 | 0.6177 | 1.6669 | 20.4 |
| 14 | | 292.46212 | 0.77067 | | |
| 15 | Eighth Lens | −13.10732 | 0.3 | 1.5441 | 56.1 |
| 16 | | 2.7052 | 0.20455 | | |
| 17 | Filter | Infinity | 0.11 | | |
| 18 | | Infinity | 0.63 | | |
| 19 | Image Capturing Surface | Infinity | | | |

According to the third example, an overall focal length of the optical imaging system f is 6.10 mm, Fno is 1.35, BFL is 0.945 mm, FOV is 76.4°, and IMG HT is 4.7 mm.

Fno, BFL, FOV, and IMG HT are defined the same as in the first example.

In the third example, the first lens 310 may have positive refractive power, and a first surface of the first lens 310 may be convex and a second surface of the first lens 310 may be concave.

The second lens 320 may have positive refractive power, and a first surface of the second lens 320 may be convex and a second surface of the second lens 320 may be concave.

The third lens 330 may have negative refractive power, and a first surface of the third lens 330 may be convex and a second surface of the third lens 330 may be concave.

The fourth lens 340 may have positive refractive power, and the first and second surfaces of the fourth lens 340 are convex in a paraxial area.

At least one inflection point may be formed on at least one of the first and second surfaces of the fourth lens 340. For example, the first surface of the fourth lens 340 may be convex in a paraxial region and become concave toward an edge thereof. The second surface of the fourth lens 340 may be convex in a paraxial region and become concave toward an edge thereof.

The fifth lens 350 may have negative refractive power, and a first surface of the fifth lens 350 may be convex in a paraxial area and a second surface of the fifth lens 350 may be concave in the paraxial area.

At least one inflection point may be formed on at least one of the first and second surfaces of the fifth lens 350. For example, the first surface of the fifth lens 350 may be convex in a paraxial region and become concave toward an edge thereof. The second surface of the fifth lens 350 may be concave in a paraxial region and become convex toward an edge thereof.

The sixth lens 360 may have positive refractive power, and the first and second surfaces of the sixth lens 360 are convex in a paraxial area.

At least one inflection point may be formed on at least one of the first and second surfaces of the sixth lens 360. For example, the first surface of the sixth lens 360 may be convex in a paraxial region and become concave toward an edge thereof.

The seventh lens 370 may have negative refractive power, and a first surface of the seventh lens 370 may be convex in a paraxial area and a second surface of the seventh lens 370 may be concave in the paraxial area.

At least one inflection point may be formed on at least one of the first and second surfaces of the seventh lens 370. For example, the first surface of the seventh lens 370 may be convex in a paraxial region and become concave toward an edge thereof. The second surface of the seventh lens 370 may be concave in a paraxial region and become convex toward an edge thereof.

The eighth lens 380 may have negative refractive power, and the first and second surfaces of the eighth lens 380 are concave in a paraxial area.

At least one inflection point may be formed on at least one of the first and second surfaces of the eighth lens 380. For example, the first surface of the eighth lens 380 may be concave in a paraxial region and become convex toward an edge thereof. The second surface of the eighth lens 380 may be concave in a paraxial region and become convex toward an edge thereof.

Respective surfaces of the first to eighth lenses 310 to 380 may have aspherical coefficients as illustrated in Table 6. For example, all of object-side surfaces and image-side surfaces of the first to eighth lenses 310 to 380 may be aspherical.

The stop ST may be disposed between the first lens 310 and the second lens 320.

TABLE 6

| | 1 | 2 | 3 | 4 | 5 | 6 | 7 | 8 |
|---|---|---|---|---|---|---|---|---|
| K | −0.80275 | −26.3981 | −0.62277 | 1.93822 | 2.62662 | −3.07051 | 0 | 0 |
| A | 0.00323 | 0.01031 | 0.01389 | 0.01832 | −0.00463 | −0.00562 | −0.00789 | −0.02293 |
| B | 0.00171 | −0.00455 | −0.00847 | −0.01403 | −0.00813 | −0.00323 | −0.01318 | 0.01966 |
| C | −0.00167 | −0.00431 | −0.00347 | 0.00075 | −0.00626 | −0.00607 | 0.02252 | −0.03211 |
| D | 0.00131 | 0.0053 | 0.00312 | 0.00128 | 0.01725 | 0.01693 | −0.02835 | 0.02766 |
| E | −0.00068 | −0.00244 | 0.00037 | 0.00145 | −0.01305 | −0.01443 | 0.02056 | −0.01502 |
| F | 0.00022 | 0.00062 | −0.00087 | −0.00164 | 0.0051 | 0.00639 | −0.00893 | 0.00508 |
| G | −0.00005 | −0.00009 | 0.0003 | 0.00061 | −0.00111 | −0.00156 | 0.00227 | −0.00102 |

TABLE 6-continued

| | | | | | | | | |
|---|---|---|---|---|---|---|---|---|
| H | 5.14E−06 | 7.52E−06 | −4.59E−05 | −1.02E−04 | 1.25E−04 | 1.99E−04 | −3.10E−04 | 1.12E−04 |
| I | −2.53E−07 | −2.67E−07 | 2.64E−06 | 6.60E−06 | −5.82E−06 | −1.01E−05 | 1.73E−05 | −5.09E−06 |

| | 9 | 10 | 11 | 12 | 13 | 14 | 15 | 16 |
|---|---|---|---|---|---|---|---|---|
| K | −7.31662 | −43.3819 | −35.9092 | −1.23189 | 7.57E+00 | 5.20574 | −3.51953 | −1.0006 |
| A | −0.05133 | −0.05031 | −0.03392 | 0.02557 | 0.04016 | 0.03375 | −0.03984 | −0.06765 |
| B | 0.03093 | 0.03382 | 0.03206 | −0.00863 | −0.02084 | −0.01856 | −0.00102 | 0.01484 |
| C | −0.03089 | −0.0266 | −0.01862 | 0.00268 | 0.00425 | 0.00411 | 0.00221 | −0.00261 |
| D | 0.02006 | 0.01384 | 0.00672 | −0.00099 | −0.00048 | −0.00057 | −0.0004 | 0.00037 |
| E | −0.00899 | −0.00502 | −0.00179 | 0.00024 | 0.00002 | 0.00005 | 0.00004 | −0.00004 |
| F | 0.00267 | 0.00125 | 0.00035 | −0.00003 | 0 | 0 | 0 | 0 |
| G | −0.00048 | −0.0002 | −0.00005 | 0 | 0 | 0 | 0 | 0 |
| H | 4.75E−05 | 1.81E−05 | 3.73E−06 | −8.03E−08 | 7.07E−09 | −4.12E−09 | −1.08E−09 | 2.92E−09 |
| I | −1.93E−06 | −6.92E−07 | −1.24E−07 | 1.15E−09 | −1.08E−10 | 4.42E−11 | 7.95E−12 | −3.05E−11 |

Figure 5:
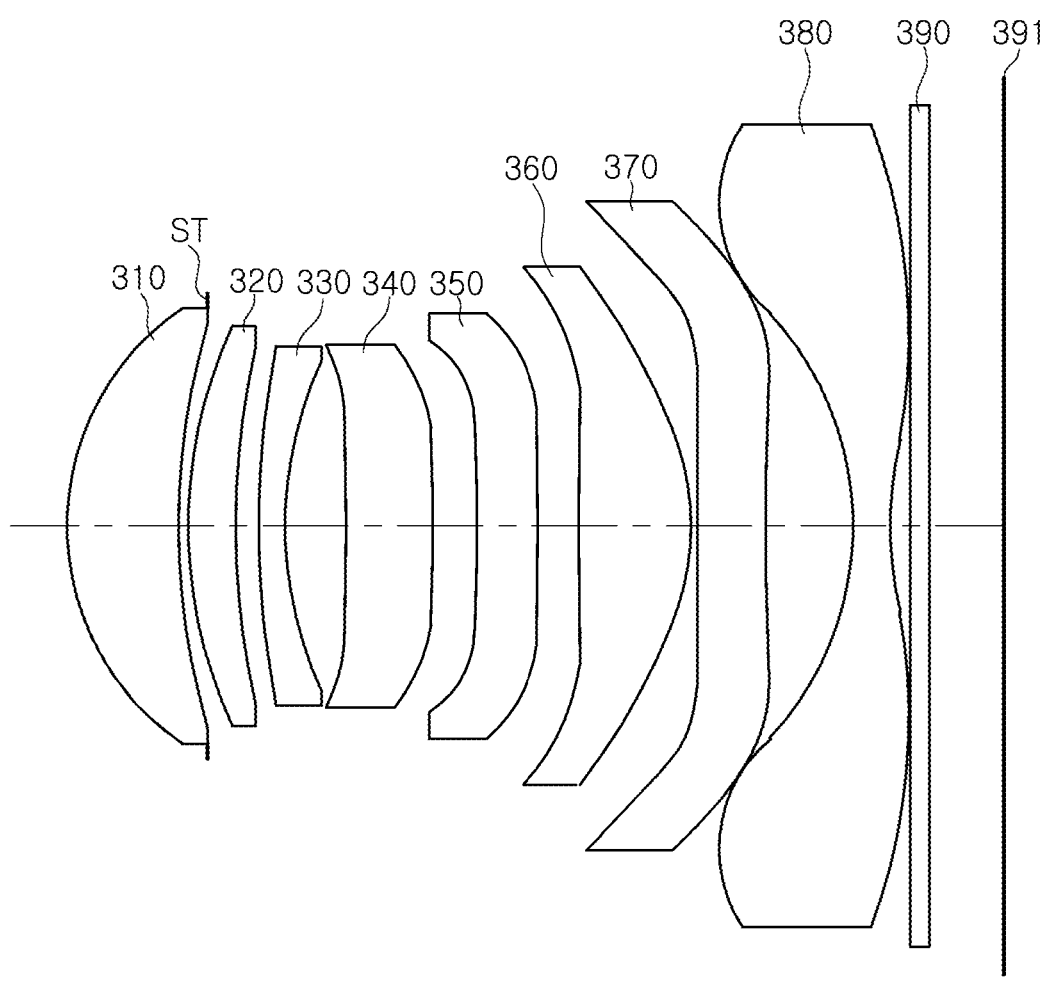
FIG. 5 is a view illustrating an optical imaging system according to a third example.
Figure 6:
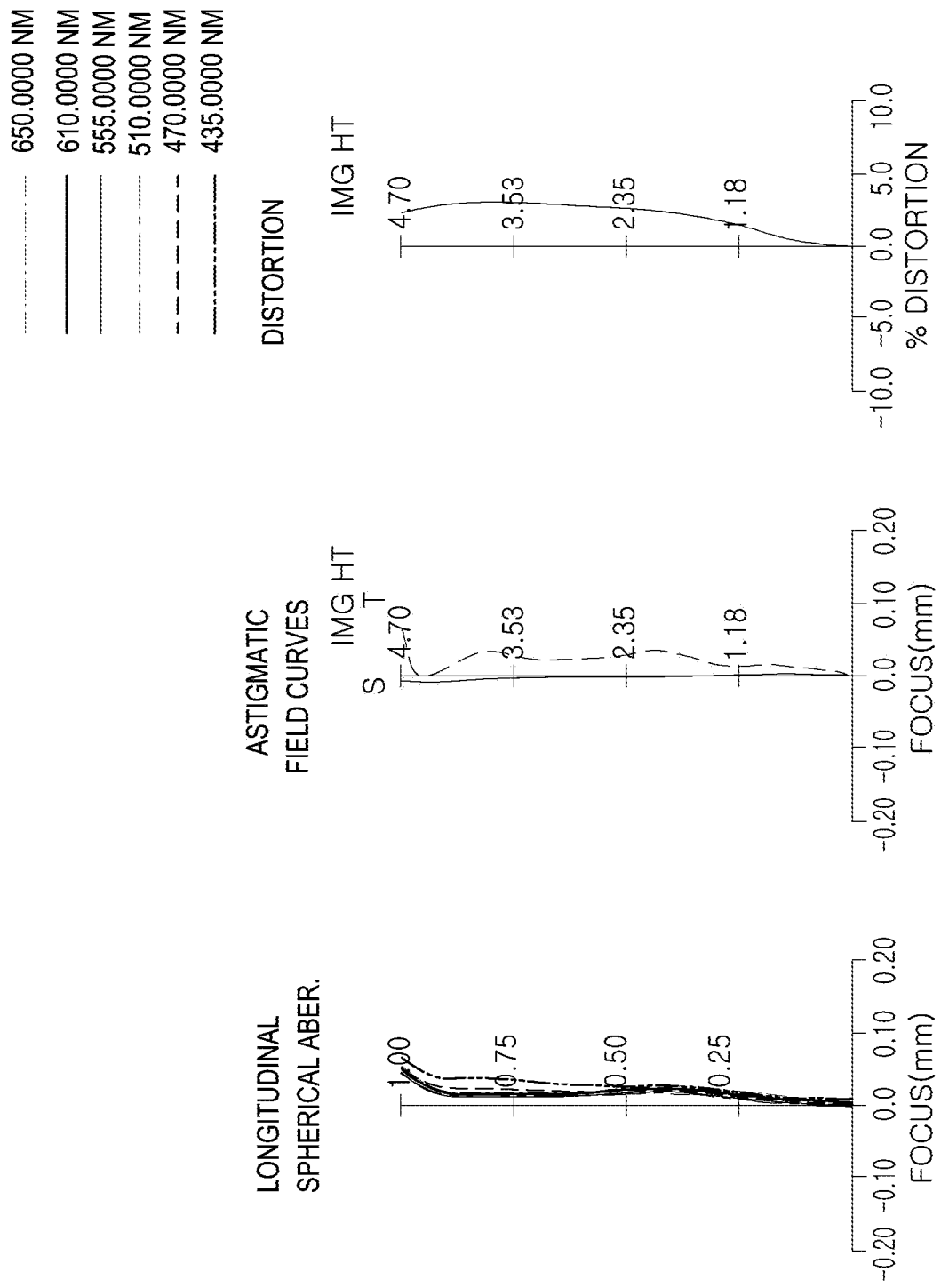
FIG. 6 is a view illustrating aberration characteristics of the optical imaging system illustrated in FIG. 5.

The imaging optical system of FIG. 5 may have the aberration characteristics illustrated in FIG. 6.

An optical imaging system according to a fourth example is hereinafter described with reference to FIGS. 7 and 8.

The optical imaging system according to the fourth example may include a first lens 410, a second lens 420, a third lens 430, a fourth lens 440, a fifth lens 450, a sixth lens 460, a seventh lens 470, and an eighth lens 480, and may further include a stop ST, a filter 490 and an image sensor 491.

Lens characteristics (radii of curvature, thicknesses of lenses or distances between the lenses, refractive indices, and Abbe numbers) of each lens are shown in Table 7.

TABLE 7

| Surface No. | Ref. | Radius of Curvature | Thickness/ Distance | Refractive Index | Abbe Number |
|---|---|---|---|---|---|
| 1 | First Lens | 3.09061 | 1.07553 | 1.5441 | 56.1 |
| 2 | Stop | 8.98568 | 0.10338 | | |
| 3 | Second Lens | 6.40632 | 0.40953 | 1.5441 | 56.1 |
| 4 | | 13.27673 | 0.19825 | | |
| 5 | Third Lens | 9.557 | 0.20676 | 1.6869 | 18.4 |
| 6 | | 4.64051 | 0.55337 | | |
| 7 | Fourth Lens | 27.09219 | 0.7921 | 1.5441 | 56.1 |
| 8 | | −57.36953 | 0.37698 | | |
| 9 | Fifth Lens | 20.1041 | 0.51358 | 1.6776 | 19.2 |
| 10 | | 9.81017 | 0.37239 | | |
| 11 | Sixth Lens | 25.61937 | 0.95146 | 1.5441 | 56.1 |
| 12 | | −3.11693 | 0.02675 | | |
| 13 | Seventh Lens | 83.36483 | 0.647 | 1.6669 | 20.4 |
| 14 | | 84.1218 | 0.81284 | | |
| 15 | Eighth Lens | −14.37874 | 0.3173 | 1.5441 | 56.1 |
| 16 | | 2.79411 | 0.23786 | | |
| 17 | Filter | Infinity | 0.11 | | |
| 18 | | Infinity | 0.58 | | |
| 19 | Image Capturing Surface | Infinity | | | |

According to the fourth example, an overall focal length of the optical imaging system f is 6.20 mm, Fno is 1.29, BFL is 0.928 mm, FOV is 73.1°, and IMG HT is 4.7 mm.

Fno, BFL, FOV, and IMG HT are defined the same as in the first example.

In the fourth example, the first lens 410 may have positive refractive power, and a first surface of the first lens 410 may be convex and a second surface of the first lens 410 may be concave.

The second lens 420 may have positive refractive power, and a first surface of the second lens 420 may be convex and a second surface of the second lens 420 may be concave.

The third lens 430 may have negative refractive power, and a first surface of the third lens 430 may be convex and a second surface of the third lens 430 may be concave.

The fourth lens 440 may have positive refractive power, and the first and second surfaces of the fourth lens 440 are convex in a paraxial area.

At least one inflection point may be formed on at least one of the first and second surfaces of the fourth lens 440. For example, the first surface of the fourth lens 440 may be convex in a paraxial region and become concave toward an edge thereof. The second surface of the fourth lens 440 may be convex in a paraxial region and become concave toward an edge thereof.

The fifth lens 450 may have negative refractive power, and a first surface of the fifth lens 450 may be convex in a paraxial area and a second surface of the fifth lens 450 may be concave in the paraxial area.

At least one inflection point may be formed on at least one of the first and second surfaces of the fifth lens 450. For example, the first surface of the fifth lens 450 may be convex in a paraxial region and become concave toward an edge thereof. The second surface of the fifth lens 450 may be concave in a paraxial region and become convex toward an edge thereof.

The sixth lens 460 may have positive refractive power, and the first and second surfaces of the sixth lens 460 are convex in a paraxial area.

At least one inflection point may be formed on at least one of the first and second surfaces of the sixth lens 460. For example, the first surface of the sixth lens 460 may be convex in a paraxial region and become concave toward an edge thereof.

The seventh lens 470 may have negative refractive power, and a first surface of the seventh lens 470 may be convex in a paraxial area and a second surface of the seventh lens 470 may be concave in the paraxial area.

At least one inflection point may be formed on at least one of the first and second surfaces of the seventh lens 470. For example, the first surface of the seventh lens 470 may be convex in a paraxial region and become concave toward an edge thereof. The second surface of the seventh lens 470 may be concave in a paraxial region and become convex toward an edge thereof.

The eighth lens 480 may have negative refractive power, and the first and second surfaces of the eighth lens 480 are concave in a paraxial area.

At least one inflection point may be formed on at least one of the first and second surfaces of the eighth lens 480. For example, the first surface of the eighth lens 480 may be concave in a paraxial region and become convex toward an edge thereof. The second surface of the eighth lens 480 may be concave in a paraxial region and become convex toward an edge thereof.

Respective surfaces of the first to eighth lenses 410 to 480 may have aspherical coefficients as illustrated in Table 8. For example, all of object-side surfaces and image-side surfaces of the first to eighth lenses 410 to 480 may be aspherical.

The stop ST may be disposed between the first lens 410 and the second lens 420.

TABLE 8

|   | 1 | 2 | 3 | 4 | 5 | 6 | 7 | 8 |
|---|---|---|---|---|---|---|---|---|
| K | −0.80532 | −26.3981 | −0.62707 | 1.93822 | 2.62662 | −3.06613 | 0 | 0 |
| A | 0.0028 | 0.00909 | 0.0109 | 0.01445 | −0.00534 | −0.00339 | −0.00695 | −0.02016 |
| B | 0.00157 | −0.00368 | −0.00139 | −0.0035 | −0.00282 | −0.01006 | −0.01 | 0.01573 |
| C | −0.00146 | −0.0032 | −0.01158 | −0.01351 | −0.00991 | 0.00992 | 0.01513 | −0.0235 |
| D | 0.00102 | 0.00361 | 0.0101 | 0.01435 | 0.01591 | −0.00362 | −0.01791 | 0.01861 |
| E | −0.00046 | −0.00152 | −0.00399 | −0.00679 | −0.01013 | 0.00048 | 0.01222 | −0.00935 |
| F | 0.00013 | 0.00036 | 0.00088 | 0.00176 | 0.00349 | 0.00003 | −0.00497 | 0.00293 |
| G | −0.00002 | −0.00005 | −0.00011 | −0.00025 | −0.00068 | 0.00001 | 0.00118 | −0.00055 |
| H | 2.38E−06 | 3.71E−06 | 7.79E−06 | 1.80E−05 | 6.97E−05 | −9.12E−06 | −1.49E−04 | 5.51E−05 |
| I | −1.05E−07 | −1.22E−07 | −2.32E−07 | −4.54E−07 | −2.94E−06 | 1.16E−06 | 7.71E−06 | −2.32E−06 |

|   | 9 | 10 | 11 | 12 | 13 | 14 | 15 | 16 |
|---|---|---|---|---|---|---|---|---|
| K | −7.31662 | −43.3819 | −35.9092 | −1.21289 | 7.57E+00 | 5.20574 | −3.51953 | −0.97443 |
| A | −0.04572 | −0.04334 | −0.02972 | 0.02201 | 0.0354 | 0.02975 | −0.03529 | −0.05931 |
| B | 0.02572 | 0.02495 | 0.02547 | −0.00635 | −0.01697 | −0.01509 | −0.00114 | 0.0118 |
| C | −0.02413 | −0.01738 | −0.01339 | 0.00165 | 0.0032 | 0.00308 | 0.00179 | −0.00188 |
| D | 0.015 | 0.00813 | 0.00437 | −0.00058 | −0.00034 | −0.0004 | −0.0003 | 0.00024 |
| E | −0.00646 | −0.00272 | −0.00106 | 0.00013 | 0.00002 | 0.00004 | 0.00003 | −0.00002 |
| F | 0.00183 | 0.00064 | 0.00019 | −0.00002 | 0 | 0 | 0 | 0 |
| G | −0.00031 | −0.0001 | −0.00002 | 0 | 0 | 0 | 0 | 0 |
| H | 2.92E−05 | 8.24E−06 | 1.77E−06 | −3.62E−08 | 3.54E−09 | −2.16E−09 | −5.91E−10 | 1.30E−09 |
| I | −1.12E−06 | −2.96E−07 | −5.42E−08 | 4.73E−10 | −4.99E−11 | 2.15E−11 | 4.04E−12 | −1.24E−11 |

Figure 7:
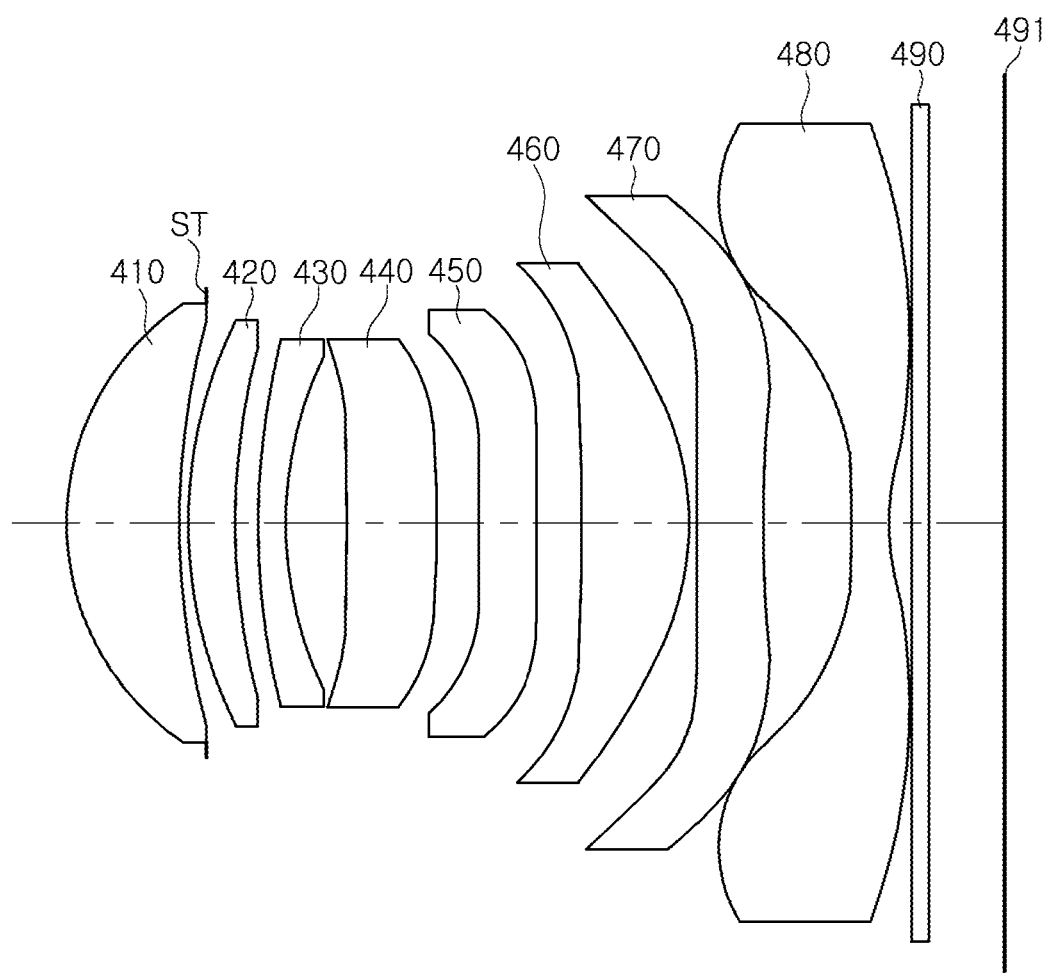
FIG. 7 is a view illustrating an optical imaging system according to a fourth example.

The imaging optical system of FIG. 7 may have the aberration characteristics illustrated in FIG. 8.

According to examples of an optical imaging system described above, an aberration improvement effect may be improved, while high resolution may be implemented.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens, a third lens having negative refractive power, a fourth lens having positive refractive power and comprising a convex image-side surface in a paraxial region thereof, a fifth lens having negative refractive power, a sixth lens having positive refractive power, a seventh lens, and an eighth lens, which are sequentially arranged from an object side optical imaging system,
wherein the first lens has positive refractive power and the second lens has positive refractive power, and
wherein at least three of the lenses have negative refractive power with a refractive index greater than 1.66.

2. The optical imaging system of claim 1, wherein a refractive index of lenses having negative refractive power, among the first lens to the seventh lens, is greater than a refractive index of lenses having positive refractive power.

3. The optical imaging system of claim 2, wherein the third lens has a refractive index greater than 1.68, and among the lenses, the refractive index of the third lens is the greatest.

4. The optical imaging system of claim 1, wherein FOV>70°, where FOV is a field of view of an imaging system including the lenses.

5. The optical imaging system of claim 1, wherein f/EPD<1.5, where f is an overall focal length of an imaging system including the lenses, and EPD is a diameter of an entrance pupil.

6. The optical imaging system of claim 1, further comprising a stop disposed between the first lens and the second lens.

7. The optical imaging system of claim 6, wherein SD/TD>0.8, where SD is an optical axis distance from the stop to an image-side surface of the eighth lens, and TD is an optical axis distance from an object-side surface of the first lens to the image-side surface of the eighth lens.

8. The optical imaging system of claim 1, wherein TTL/(2*IMG HT)<0.9, where TTL is an optical axis distance from an object-side surface of the first lens to an image capturing surface of an image sensor, and IMG HT is half of a diagonal length of the image capturing surface of the image sensor.

9. The optical imaging system of claim 1, wherein the seventh lens has positive or negative refractive power, and the eighth lens has negative refractive power.

10. An optical imaging system, comprising:
a first lens, a second lens, a third lens having negative refractive power, a fourth lens having positive refractive power and comprising a convex image-side surface in a paraxial region thereof, a fifth lens having negative refractive power, a sixth lens having positive refractive power, a seventh lens, and an eighth lens, which are sequentially arranged from an object side optical imaging system, wherein the first lens has positive refractive power and the second lens has positive refractive power, wherein at least four lenses among the third lens to the eighth lens have negative refractive power, and wherein at least three of the lenses have negative refractive power with a refractive index greater than 1.66.

11. The optical imaging system of claim 10, wherein Fno<1.5, where Fno is an F-number of an imaging system including the lenses.

12. The optical imaging system of claim 10, wherein an absolute value of a focal length of the seventh lens is the greatest among the lenses.

13. The optical imaging system of claim 10, wherein an absolute value of a focal length of the eighth lens is the least among the lenses.

14. The optical imaging system of claim 10, wherein each of the first lens, the second lens, the third lens, the fourth lens, the fifth lens, the sixth lens, the seventh lens, and the eighth lens are spaced apart from each other along an optical axis of the optical imaging system.

15. The optical imaging system of claim 1, wherein each of the first lens, the second lens, the third lens, the fourth lens, the fifth lens, the sixth lens, the seventh lens, and the eighth lens are spaced apart from each other along an optical axis of the optical imaging system.

16. The optical imaging system of claim 1, wherein the optical imaging system comprises a total of eight lenses.

17. An optical imaging system, comprising:

a first lens, a second lens, a third lens having negative refractive power, a fourth lens having positive refractive power and comprising a convex image-side surface in a paraxial region thereof, a fifth lens having negative refractive power, a sixth lens having positive refractive power, a seventh lens, and an eighth lens, which are sequentially arranged from an object side optical imaging system, wherein the first lens has positive refractive power and the second lens has positive refractive power, wherein at least four lenses among the third lens to the eighth lens have negative refractive power, wherein a refractive index of at least one of the lenses having negative refractive power is greater than 1.68, and wherein Fno<1.5, where Fno is an F-number of an imaging system including the lenses.

\* \* \* \* \*